United States Patent

Kynast et al.

[11] Patent Number: 5,900,695
[45] Date of Patent: May 4, 1999

[54] LUMINESCENT SCREEN INCLUDING A LUMINESCENT ZEOLITE

[75] Inventors: Ulrich H. Kynast, Roetgen; Volker U. Weiler, Aachen, both of Germany

[73] Assignee: U.S. Phillips Corporation, New York, N.Y.

[21] Appl. No.: 08/795,160

[22] Filed: Feb. 7, 1997

[30] Foreign Application Priority Data

Feb. 8, 1996 [EP] European Pat. Off. .............. 96200281

[51] Int. Cl.⁶ ............................. C09K 11/08; H01J 1/62

[52] U.S. Cl. ..................... 313/486; 313/468; 252/301.5

[58] Field of Search ..................................... 313/486, 483, 313/467, 468, 503; 252/301.4 R, 301.4 H, 301.5

[56] References Cited

U.S. PATENT DOCUMENTS

| | | | |
|---|---|---|---|
| 3,149,982 | 9/1964 | Eppler | 252/301.4 H |
| 4,767,566 | 8/1988 | Kiss et al. | 252/301.6 R |
| 5,567,351 | 10/1996 | Qi et al. | 252/301.4 R |
| 5,574,332 | 11/1996 | Kynast et al. | 313/483 |

*Primary Examiner*—Sandra O'Shea
*Assistant Examiner*—Michael Day
*Attorney, Agent, or Firm*—F. Brice Faller

[57] ABSTRACT

A luminescent screen includes a luminescent zeolite containing rare earths, such as terbium (Tb), and europium (Eu), and an oxide of a transition metal, such as, molybdenum (Mo), tungsten (W), niobium (Nb), and tantalum (Ta). It was found that a zeolite containing both terbium, and tungsten oxide had an absorbability that was approximately 60 times as high as that of a zeolite containing only terbium, thus increasing the luminescent efficiency of the zeolite.

8 Claims, No Drawings

LUMINESCENT SCREEN INCLUDING A LUMINESCENT ZEOLITE

BACKGROUND OF THE INVENTION

The invention relates to a luminescent screen comprising a bearer provided with a luminescent material comprising a luminescent zeolite containing rare earth ions.

The invention also relates to luminescent zeolites for use in such a luminescent screen and a method for preparing such zeolites as well as to a low pressure mercury discharge lamp comprising such a luminescent screen.

A luminescent screen as described in the opening paragraph is known from international patent application WO 95/16759. In general a luminescent screen is used to convert excitation energy into radiation with a certain range of wavelengths. The excitation energy can for instance consist of an electron beam, X-rays or UV- radiation of relatively short wavelengths. Among many other applications luminescent screens find application in lamps, particularly in low pressure mercury discharge lamps or fluorescent lamps. The excitation energy then mainly comprises UV-radiation of approximately 254 nm generated by mercury present in the plasma of the fluorescent lamp. The composition of the luminescent screen is chosen in dependence on the desired spectral composition of the light radiated by the fluorescent lamp. In the known luminescent screen the rare earth ions contained in the zeolite are $Ce^{3+}$ ions. When the known luminescent screen is excited by UV radiation with a wavelength of 254 nm it emits light having an emission maximum at a wavelength between 300 and 400 nm. Such a luminescent screen can for instance be used very effectively in low pressure mercury discharge lamps for use in photochemical processes, such as polymerization, lacquer hardening, drying, curing, medical irradiation purposes or suntanning. The quantum efficiency of the zeolite in the known luminescent screen is very high. Because the rare earth ions are enclosed by the zeolite structure the known luminescent screen is also very stable in different chemical environments and within a wide temperature range. Zeolites are also generally very cheap and environment-friendly. Most of the time, however, it will be desirable that the fluorescent lamp radiates light in the visible part of the spectrum. Such an emission in the visible part of the spectrum can be realized by the incorporation of other rare earth ions in the zeolite such as e.g. $Tb^{3+}$ ions. When a luminescent screen provided with a luminescent material comprising a zeolite containing $Tb^{3+}$ ions is excited by means of UV-radiation with a wavelength of 254 nm, visible radiation with wavelengths within the range 450–650 nm is emitted by the luminescent screen. A problem, however, that is associated with many zeolites containing rare earth ions emitting visible light upon excitation with UV-radiation with a wavelength of 254 nm, is that the absorption of the exciting radiation is very low so that the amount of visible light that is generated out of the exciting radiation is relatively low.

SUMMARY OF THE INVENTION

It is an object of the present invention to provide a luminescent screen that emits visible light upon excitation by UV-radiation with a wavelength of 254 nm, that is stable and generates a relatively large amount of visible radiation out of the exciting radiation.

A luminescent screen to the invention is characterized in that the zeolite further comprises a transition metal oxide. It has been found that a luminescent screen according to the invention generates visible radiation with a relatively high efficiency when excited by UV-radiation with a wavelength of 254 nm.

It has been found that relatively good results were obtained in case the number of rare earth ions per unit cell of the zeolite is at least 1. Similarly relatively good results were obtained in case the number of transition metal ions per unit cell of the zeolite is at least 1.

More in particular the luminescent screen had a comparably high efficiency, in case the zeolite is of the Faujasite type.

Very good results were obtained for luminescent screens wherein the rare earth metal ions comprise $Th^{3+}$ ions and/or $Eu^{3+}$ ions.

Very good results were also obtained for luminescent screens wherein the transition metal oxide comprises one or more oxides chosen from the group formed by molybdenum oxide, tungsten oxide, niobium oxide and tantalum oxide.

It has been observed that the luminescent screen had a comparatively high efficiency in case the zeolite was prepared by a method comprising the successive steps:

incorporating rare earth ions into a zeolite by means of ion exchange, heat treatment of the zeolite, incorporating a transition metal compound into the zeolite, and conversion of the transition metal compound into transition metal oxide.

The incorporation of the transition metal compound can be carried out in a solution or from the gas phase. Suitable precursors of e.g. tungsten oxide are volatile or soluble species, for instance chlorides, oxychlorides or carbonyls ($WCl_6$, $WOCl_4$, $W(CO)_6$ and the like).

DETAILED DESCRIPTION OF THE PREFERRED EMBODIMENT

The following is a typical example of the preparation of a zeolite according to the invention.

2 gram of a zeolite of approximate formula $Na_{86.9}(Al_{86.9}Si_{105.1}O_{384})*264\ H_2O$ is suspended in 18.24 ml $H_2O$, and the pH is adjusted to ca. 5 using 0.1 n HCl. 1.76 ml of aqueous $TbCl_3$ (1M) are added. The resulting solution is refluxed for 24 hours. The solid is then filtered off, washed with $H_2O$ (3×20 ml) and dried at 120° C. in vacuo. The resulting powder is calcined under oxygen at 400° C. for 1 hour (heating-up rate 1° C./minute). The resulting first product was of the approximate formula $Tb_{16}Na_{38.9}(Al_{86.9}Si_{105.1}O_{384})*264\ H_2O$. This corresponds to approximately 16 $Tb^{3+}$ ions per unit cell.

1 gram of the powder is brought into an evacuable glass frit, the bottom of which holds a small container with 0.5 gram $W(CO)_6$. The container is then held in a warming bath from which $W(CO)_6$ is sublimed through the frit into the zeolite at a pressure lower than 0.01 mbar. The temperature can range from room temperature to 90° C. When all the $W(CO)_6$ has vanished from the container, the zeolite is taken from the frit and placed into a soxhlet to be extracted with THF for up to 24 hours. A white material is obtained, which is suspended in 25 ml of water and mixed with 5 ml of 30% $H_2O_2$ and refluxed for one hour. After filtering off, the powder is heated at 600° C. for two hours under an oxygen stream, which was bubbled through water before contacting the phosphor. The resulting second product was of the approximate formula $Tb_{16}(WO_x)_6Na_{38.9}(Al_{86.9}Si_{105.1}O_{384})*264\ H_2O$, wherein the value of x is not known.

It was found that the zeolite containing both $Tb^{3+}$ ions and tungsten oxide (second product) had an absorbability that was approximately 60 times as high as that of the zeolite containing only $Tb^{3+}$ ions (first product). Under identical excitation conditions the amount of visible light in the spectral range between 400 and 650 nm generated by the second product is approximately 20 times as high as that generated by the first product. A relatively small amount of tungsten oxide thus raises the efficiency of the luminescing zeolite surprisingly much. The emission spectra of the first and the second product are practically the same.

We claim:

1. Luminescent screen comprising a bearer provided with a luminescent material comprising a zeolite containing rare earth ions, characterized in that the zeolite further comprises a transition metal oxide, wherein said transition metal oxide consists essentially of tungsten oxide.

2. Luminescent screen according to claim 1, wherein the rare earth ions comprise $Tb^{3+}$ ions.

3. Luminescent screen according to claim 1, wherein the rare earth ions comprise $Eu^{3+}$ ions.

4. Luminescent screen according to claim 1, wherein the zeolite is of the Faujasite-type.

5. Luminescent screen according to claim 1, wherein the number of rare earth ions per unit cell of the zeolite is at least 1.

6. Luminescent screen according to claim 1, wherein the number of rare earth ions per unit cell of the zeolite is at least 1.

7. Low pressure mercury discharge lamp comprising a luminescent screen according to claim 1.

8. Luminescent screen as in claim 2 wherein the luminescent material consists essentially of $Tb_{16}(WO_x)_6Na_{38.9}(Al_{86.9}Si_{105.1}O_{384}) * 264\ H_2O$.

* * * * *